United States Patent

Anderson

[19]

[11] Patent Number: 5,905,910
[45] Date of Patent: May 18, 1999

[54] SYSTEM FOR MULTI-THREADED DISK DRIVE OPERATION IN A COMPUTER SYSTEM USING AN INTERRUPT PROCESSOR SOFTWARE MODULE ANALYZING AND PROCESSING INTERRUPT SIGNALS TO CONTROL DATA TRANSFER

[75] Inventor: Eric D. Anderson, Hudson, Wis.

[73] Assignee: Micron Electronics, Inc., Boise, Id.

[21] Appl. No.: 08/657,601

[22] Filed: May 31, 1996

[51] Int. Cl.$^6$ .................................................. G06F 13/00
[52] U.S. Cl. ........................................... 395/841; 711/150
[58] Field of Search .................................... 395/822, 736, 395/309, 733, 670, 677, 841; 711/100, 150; 361/686

[56] References Cited

U.S. PATENT DOCUMENTS

| | | | |
|---|---|---|---|
| 4,888,691 | 12/1989 | George et al. | 364/300 |
| 5,058,004 | 10/1991 | Ravid | 395/822 |
| 5,237,466 | 8/1993 | Glaser et al. | 300/73.03 |
| 5,239,445 | 8/1993 | Parks et al. | 361/686 |
| 5,421,014 | 5/1995 | Bucher | 395/670 |
| 5,459,872 | 10/1995 | Connell et al. | 395/736 |
| 5,581,715 | 12/1996 | Verinsky et al. | 395/309 |
| 5,642,516 | 6/1997 | Hedayat et al. | 395/733 |
| 5,694,604 | 12/1997 | Reiffin | 395/677 |
| 5,701,513 | 12/1997 | Kaneko | 395/826 |
| 5,708,848 | 1/1998 | Sangveraphunsiri et al. | 395/841 |
| 5,724,539 | 3/1998 | Riggle et al. | 711/100 |
| 5,754,759 | 5/1998 | Clarke et al. | 395/183.13 |
| 5,790,870 | 8/1998 | Hausauer et al. | 395/733 |
| 5,819,112 | 10/1998 | Kusters | 395/856 |

*Primary Examiner*—Thomas C. Lee
*Assistant Examiner*—David Ton
*Attorney, Agent, or Firm*—Seed and Berry LLP

[57] ABSTRACT

A system for multi-threaded disk drive interrupt processing uses a flag register containing encoded data bits to indicate the current status of at least two disk drives. Instructions in a basic input-output system (BIOS) causes a central processing unit (CPU) to execute instructions to transfer data to the two disk drives. The system permits both disk drives to be simultaneously active. The system can issue commands to a first disk drive and, while the first disk drive is responding to those commands, issue additional commands to a second disk drive to prepare for additional data transfers. When one of the two disk drives generates an interrupt, the system can determine which disk drive generated the interrupt and process the interrupt. If the operating system is a multi-threaded operating system, the present invention interrupts the ongoing thread to process the interrupt. The present invention then returns control to CPU to the ongoing thread so that it may complete the ongoing thread before transferring data to or from the disk drive that generated the interrupt. The system may apportion a data file into segments that are stored alternately on the first disk drive and the second disk drive. Overall data transfer efficiency is improved by having the second disk drive responding to commands while the first disk drive is transferring data. During a subsequent transfer of a portion of a data file to the second disk drive, the first disk drive may be responding to commands for the transfer of additional portions of the data file. Thus, the system alternately transfers portions of data to or from the first and second disk drives.

22 Claims, 3 Drawing Sheets

SYSTEM FOR MULTI-THREADED DISK DRIVE OPERATION IN A COMPUTER SYSTEM USING AN INTERRUPT PROCESSOR SOFTWARE MODULE ANALYZING AND PROCESSING INTERRUPT SIGNALS TO CONTROL DATA TRANSFER

TECHNICAL FIELD

The present invention relates generally to interrupt processing, and more particularly, to a system for multi-threaded disk drive interrupt processing with two or more disk drives in a computer.

BACKGROUND OF THE INVENTION

The use of computers, especially personal computers (PCs) is widespread. The computing power of the PC, whether coupled to a network or operating as a stand-alone device, has increased significantly as new computer designs move into production. Central processing units have become faster and more complex with each new generation of PC. Memory chips have also increased in both capacity and speed. Other elements, such as disk drives and compact disk read-only memory drives are common on PCs.

While the speed of central processing units and memories have increased, there are limitations to the speed at which a disk drive can transfer data. That is, reading data from the disk drive, or writing data to the disk drive is slow relative to the processing speed of the central processing unit and memory. Before data can be transferred to or from the disk drive, the central processing unit must send commands to the disk drive and wait for the disk drive to locate the appropriate physical position on the storage media at which to read data or write data. The disk drive generates an interrupt when it is ready for the data transfer. The interrupt must be processed by the central processing unit to actually transfer data. In a computer system with multiple disk drives, only one disk drive can be active at a time. In other words, only one disk drive can be actively locating the appropriate location on the storage media and generating interrupts. Therefore, it can be appreciated that there is a significant need for a system for multi-threaded disk drive interrupt processing. The present invention provides this and other advantages as will be apparent from the following detailed description and accompanying figures.

SUMMARY OF THE INVENTION

The present invention is embodied in a system for the simultaneous operation of multiple disk drives in a computer. The system includes a first disk drive having an interrupt generating circuit to generate a first interrupt signal. The first disk drive receives a first disk transfer command from the computer, processes the first disk transfer command, and generates the first interrupt signal upon completion of the first disk data transfer command. The system also includes a second disk drive, also having an interrupt generating circuit to generate a second interrupt signal. The second disk drive receives a second disk transfer command from the computer while the first disk drive is processing the first disk transfer command such that both the first and second disk drives are simultaneously active. The second disk drive processes the second disk transfer command and generates the second interrupt signal upon completion of the second disk data transfer command. The system further includes an interrupt detector to detect the first and second interrupt signals and to generate an interrupt indicator signal in response thereto. In one embodiment, the interrupt indicator signal may be a predetermined pattern of data bits in a flag register. The system also includes an interrupt processor to analyze the interrupt indicator signal and to determine therefrom which of the first and second disk drives generated an interrupt. The interrupt processor controls the transfer of data between the computer and the disk drives which generated the interrupt signal.

In one embodiment, the first disk drive receives a third disk data transfer command from the computer while the second disk drive is processing the second disk transfer command such that the first and second disk drives are simultaneously active in processing the third and second disk data transfer commands, respectively. The system may also be used for disk transfers when the computer is simultaneously executing first and second application programs. The first application program generates the first disk data transfer command to control data transfer between the first disk drive and the first application program, while the second application program generates the second disk data transfer command to control data transfer between the second disk drive and the second application program while the first disk drive is processing the first data transfer command.

In a preferred embodiment, data transfers to and from the processor alternates between the first and second disk drives, with the first disk drive generating the first interrupt signal when ready to transfer a first portion of data and a second disk drive generating the second interrupt signal when ready to transfer a second portion of data. The disk data transfer commands from the computer can be sequentially received by the first and second disk drives to transfer the first and second portions of data, respectively. The interrupt processor will transfer the portion of data to the first one of the first and second disk drives to generate an interrupt signal. While the first and second disk data transfer commands are sequentially sent to the first and second disk drives, either disk drive may be the first to generate its interrupt signal. If the first disk drive generates the first interrupt signal prior to the second disk drive generating the second interrupt signal, the interrupt processor transfers the first portion of data between the computer and the first disk drive prior to the interrupt processor transferring the second portion of data between the computer and the second disk drive.

DETAILED DESCRIPTION OF THE INVENTION

Figure 1:
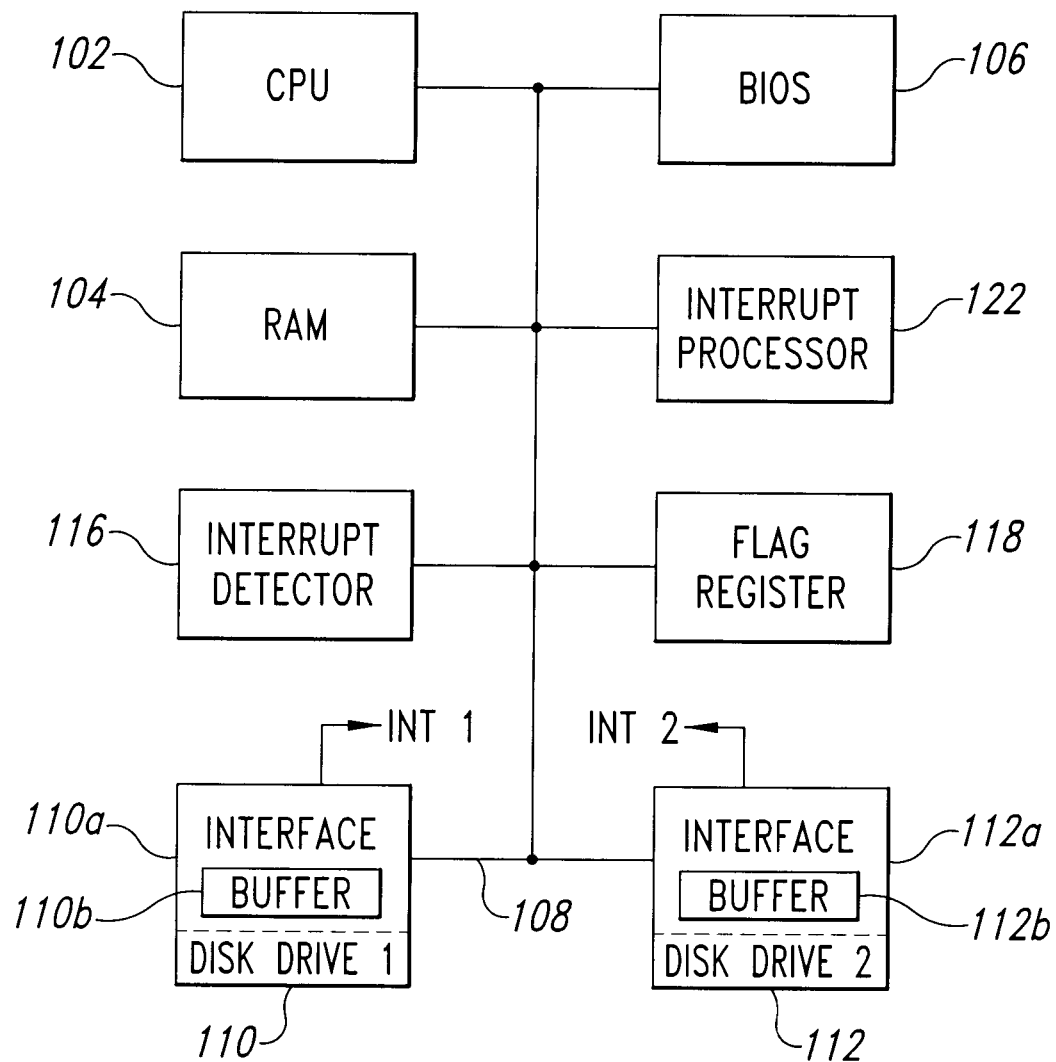
FIG. 1 is a functional block diagram of one embodiment the system of the present invention.

A typical computer contains a single disk drive. While processing speeds and memory access times have been reduced by improvements to the integrated circuit technology, disk access time is still relatively slow. Disk access time is defined as the time from which a command is issued to the disk drive to the time at which the disk drive actually performs the requested task. For example, if the user wishes to read a data file from the hard disk drive, the computer issues a disk read command along with data informing the disk drive of the physical location of the file on the disk. The disk drive must position the read/write head (not shown) at the proper physical location on the disk surface before any data can be read. Thus, there is a significant delay between the time that a command is issued to the disk drive and the time that the disk drive actually carries out that command. Similar delays occur when writing data to the disk drive.

The process of transferring data to or from the hard disk is performed by the operating system, such as Microsoft MS-DOS® or Windows® 95. Operations that are carried out by the operating system are sometimes referred to as processes or threads. Operating systems such as MS-DOS® only operate on a single thread or process at a time. Other operating systems, such as Windows® 95 are multi-tasking and can process multiple threads. For example, the operating system may read data entered by the user on a keyboard (not shown) while also maintaining an accurate time on a real-time clock (not shown). As those skilled in the art readily understand, multi-tasking operating systems are in reality executing only a single process at a time. However, such operating systems are capable of regulating several independent processes with the central processing unit executing instructions for each process in a form of time-division multiplexing. Thus, it appears to the user that several independent processes are executing simultaneously. However, the conventional operating system is incapable of multi-threaded disk drive processing. That is, only a single disk drive can be active at one time. A flag register (not shown), which is typically one byte in length, contains status information, such as an interrupt status, from the active disk drive.

Even if the prior art computer contains two disk drives, only one disk drive can be active at one time. Thus, the disk drive operations are referred to as single-threaded processes. If the computer is reading a data file from one disk drive, it issues a read command to that disk drive. When the read/write head for that disk drive is at the appropriate physical location, the disk drive fells an internal buffer with data and generates an interrupt. The interrupt handler software routine sets data bits in the flag register to predetermined values to indicate the presence of an interrupt. The computer inherently knows which disk drive generated the interrupt because only one disk drive is active at a time. Thus, the presence of two disk drives provides increased storage capacity, but does nothing to enhance system performance.

In a preferred embodiment, the present invention incorporates two disk drives into a single computer and permits multi-threaded interrupt processing for the two disk drives. Furthermore, the present invention is capable of operation with conventional operating systems and is transparent to the conventional operating systems. The present invention accepts disk commands from the operating system and generates the appropriate sequence commands to the two disk drives such that the operating system believes only a single disk drive is present. This concept will be explained in greater detail below.

The present description provides examples for interrupt processing when reading data stored on hard disk drives. Similar interrupt processing occurs for write operations when storing data on disk drives. However, the actual data processing are slightly different for read and write operations. In the interest of clarity, those differences will be briefly described. When performing a read operation, the disk drive receives a read command as well as additional data indicating the physical location of data on the disk drive. The disk drive positions the read/write head at the appropriate physical location and reads data until an internal buffer in the disk drive is full. At that point, the disk drive interface generates an interrupt to indicate that it is ready to transfer data to the processor. In contrast, when writing data to the disk drive, the processor fills the internal buffer on the disk drive with data to be stored on the disk drive and issues a write command, as well as data indicating the physical location on the disk drive where data will be stored. In response to the write command, the disk drive positions the read/write head at the appropriate location and stores the data contained within the internal buffer. When the internal buffer is empty, the disk drive interface generates an interrupt, thus indicating that it has completed the task and is prepared to receive additional data. Thus, the disk drive interface generates an interrupt during a read operation when the internal buffer in the disk is full, while the disk drive interface generates an interrupt during a write operation to indicate that the internal buffer is empty. The present invention is directed to multi-threaded interrupt processing, and applies to both read and write operations.

With two disk drives and multi-threaded interrupt processing, a data file can be broken up into multiple portions, with alternating portions being stored on each respective disk drive. This process is referred to herein as disk striping. For example, if the user wishes to read a stored data file, a read command is issued consecutively to the first and second disk drives, respectively. The first disk drive generates an interrupt when it is prepared to transfer data from the internal buffer, and the second disk drive generates an interrupt while the first disk drive is transferring data. A first block of data is read from the first disk drive, while the second block of data is read from the second disk drive. This process may be continued for additional blocks of data such that alternating blocks of data are read from the two disk drives. As a result, disk access time is greatly reduced by virtue of the two disk drives being simultaneously active. Thus, the first disk drive may be receiving data while the second disk drive is positioning the read/write head in preparation for receiving the subsequent block of data. The process of disk striping is described in detail in co-pending U.S. patent application Ser. No. 08/370,650, entitled "Multi-Drive Virtual Mass Storage Device and Method of Operating Same" filed on Jan. 10, 1996, now U.S. Pat. No. 5,671,439, and is incorporated herein by reference in its entirety.

Another application for the present invention is in the operation of application programs accessing data files located on the separate disk drives. While one application program may be accessing the first disk drive, the second application program can access the second disk drive thus increasing overall efficiency of the computer. It should be noted that it is not possible to simultaneously transfer data to two disk drives with the present invention, but that the two disk drives may still be active simultaneously with data being transferred to one disk drive while the second disk drive is preparing for a data transfer.

For the simultaneous activation of two disk drives to be effective, it is necessary for a new multi-threaded interrupt processing system so that the computer may determine which of the two active disk drives has generated an interrupt. The present invention is directed to multi-threaded interrupt processing. One embodiment of the present invention is embodied in a system 100 illustrated in the functional block diagram of FIG. 1. The system 100 includes a central processing unit 102, such as an Intel Pentium® microprocessor. The system 100 also includes a random access memory (RAM) 104, and a read-only memory (ROM) containing computer instructions known as a basic input-output system (BIOS) 106. The BIOS 106 is used to initialize the CPU 102 and various input-output devices. During initializing of the computer containing the system 100, the contents of the BIOS 106 are copied to the RAM 104 to permit faster access to the computer instructions in the BIOS. However, for the sake of clarity, those instructions are referred to herein as BIOS instructions whether they are executed from the read-only memory BIOS 106 or the RAM 104. As is known in the art, the BIOS provides instructions that are executed by the CPU 102 to control the transfer of data to and from disk drives.

The various components of the system 100 are coupled together by a bus system 108, which may carry power and control signals in addition to data and addresses. The bus system 108 may consist of a single bus or several busses interconnected by bus bridges (not shown). However, for the sake of brevity and clarity, the bus system 108 is represented in FIG. 1 by a single bus. Also for the sake of simplicity, other conventional components, such as a power supply, mouse, keyboard, display, etc., are not shown in FIG. 1. As is known in the art, the BIOS 106 also contains instructions that are executed by the CPU 102 to control communications with input-output devices such as the keyboard and display.

The system 100 also includes a first disk drive 110 and its associated disk drive interface 110a, including an internal buffer 110b. The system 100 also includes a second disk drive 112, and its associated interface 112a, including an internal buffer 112b. Several different disk drives may be used in a conventional PC, and will operate satisfactorily with the system 100. For example, the first and second disk drives 110 and 112 may be integrated device electronics (IDE) disk drives wherein the disk drive itself contains many of the required interface components. With IDE disk drives, a single interface coupled to the bus system 108 is capable of operating multiple IDE disk drives. However, the system 100 will operate satisfactorily with disk drives of other types, such as a small computer system interface (SCSI) disk drive. In addition, the system 100 may incorporate more than two disk drives. While the examples presented herein are directed to a two disk drive system, and multi-threaded interrupt processing for two disk drives, principles of the present invention may be readily extended to three or more disk drives.

A disk transfer is initiated when the operating system issues a disk command, such as a read or write command. The BIOS 106 translates the command from the operating system to generate data to select a cylinder, head, address, and the like on the selected disk drive. In response to this data, the selected disk drive will prepare for a data transfer by positioning the read/write head (not shown) at the selected physical location on the disk drive and reading data into the internal buffer. The first disk drive 110 and second disk drive 112 will each generate an interrupt, INT1 and INT2, respectively, upon completion of the disk command.

The system 100 includes an interrupt detector 116, which detects interrupts INT1 and INT2 from the first and second disk drives 110 and 112, respectively. The interrupt detector 116, which is sometimes called an interrupt handler, detects the generation of the interrupt and sets data bits in a flag register 118. The flag register 18 may be part of the memory 104, an internal register within the CPU 102 or other suitable storage location. Unlike the flag registers of the prior art, which contain data for the single active disk thread, the flag register 118 of the present invention contains data indicating the status of both the first and second disk drives 110 and 112. Two bits in the flag register 118 are encoded, as shown below in Table 1, to indicate the current status of both the first and second disk drives 110 and 112.

TABLE 1

| Flag Register (Hex) | Status |
| --- | --- |
| 00 | No Interrupt |
| 01 | Drive 1 Interrupt |
| 02 | Drive 2 Interrupt |
| 03 | Drive 1 and Drive 2 Interrupts |

When the interrupt detector 116 detects an interrupt from the first disk drive 110 or the second disk drive 112, it sets the data bits in the flag register to the appropriate value, as indicated in Table 1. In addition to individual interrupts from the first disk drive 110 and the second disk drive 112, it is possible that both disk drives may generate an interrupt before the CPU 102 can process the interrupts. In this case, the interrupt detector sets the bits in the flag register to 03H. The interrupt detector 116 also resets the interrupt bit in the disk drive interface 110a or 112a that generated the interrupt.

If the system 100 is controlled by a single task operating system, such as MS-DOS®, it can process an interrupt and transfer data immediately upon detection of the interrupt. The system 100 still provides an advantage in a single tasking operating system because it permits commands to be issued to the first disk drive 110 and the second disk drive 112 such that both disk drives are active simultaneously. Thus, the system 100 advantageously allows simultaneous disk operations such as a data transfer to the first disk drive 110 while the second disk drive 112 is preparing for a data transfer by locating a selected position on the disk.

As discussed above, so called multi-tasking operating systems use a form of time-division multiplexing by the CPU 102 so that it appears that multiple processes or threads are occurring simultaneously. When an interrupt occurs in a multi-tasking operating system, the CPU 102 may be performing a different process or thread and cannot drop the ongoing thread to process the interrupt, such as transferring data to the first disk drive 110 in a response to an interrupt therefrom. Therefore, the system 100 includes a technique to register the occurrence of an interrupt while minimizing the interference with the ongoing process being performed by the CPU 102. The interrupt detector 116 determines which of the first and second disk drives 110 and 112 generated the interrupt and sets the data bits and the flag register 18 in accordance with Table 1 above. The interrupt detector 116 also resets the interrupt and returns control of the CPU 102 to the process or thread that was temporarily interrupted. The CPU 102 is then permitted to complete the current thread, or at least reach a point where the current thread can be interrupted before processing the interrupt from the first disk drive 110 or the second disk drive 112. Thus, the interrupt detector 116 interrupts the current thread only long enough to determine which of the first and second disk drives 110 and 112 generated the interrupt, set the data bits in the flag register 118 accordingly, and reset the interrupt. As those skilled in the art will readily understand, this processing causes only a brief disruption of the current thread.

When the CPU 102 has completed the current thread, or reaches a point where the current thread can be interrupted, and is able to process the interrupt from the first disk drive 110 or second disk drive 112, control of the system 100 is turned over to an interrupt processor 122, which contains the actual code to process data and execute the desired command. For example, if the desired command is to read data from the first and second disk drives 110 and 112, the process performed by the interrupt processor 122 includes the code to actually read the data from the specified disk drive or disk drives. The system 100 can determine whether the first disk drive 110 or the second disk drive 112 generated the interrupt by virtue of the encoded data bits in the flag register 118. Thus, the system 100 advantageously allows the use of two hard disk drives and can perform multi-threaded interrupt processing for the two disk drives. As a result, the two disk drives can both be active at the same time thus increasing data transfer efficiency.

It should be noted that several functions illustrated in the functional block diagram in FIG. 1, such as the interrupt detector 116 and the interrupt processor 122 are primarily software instructions that are executed by the CPU 102. These instructions are typically part of the BIOS 106 and are stored within the memory 104 as previously discussed. However, for the sake of clarity, these functions are illustrated in FIG. 1 as separate functional blocks because each performs a distinct task.

Because the CPU 102 may be performing a different read at the time an interrupt occurs, it is desirable that the software code executed by the interrupt detector 116 be as short as possible. Therefore, the steps performed by the interrupt detector 116 merely set the data bits in the flag register 118, clear the interrupt in the interface that generated the interrupt, and return to the interrupted thread.

As previously discussed, the system 100 is transparent to the operating system. While those of ordinary skill in the art readily understand the processes performed by the operating system to transfer data to or from a disk drive, these processes will be discussed briefly. The operating system, such as Microsoft Windows®, uses a file allocation table (FAT) to determine the location of a data file on the disk drive. The FAT itself is another data file stored on the disk drive and tracks the usage of the disk drive. Thus, the FAT is a form of directory that tracks locations of data files and the location of free or unused portions of the disk drive. When the operating system transfers a file to the disk drive, it uses the FAT to determine a suitable physical location on the disk at which to store the file. It should be noted that the data file may be broken into different blocks if a contiguous block of space is not available on the disk drive. Similarly, when the operating system reads a data file from the disk drive, it uses the FAT to determine the physical location of the data file on the disk drive. Once the operating system has determined the physical location of the data file using the FAT, this data is provided to the BIOS 106 which places commands in the internal registers of the disk drive interface. The data in these registers cause the disk drive to position the read/write head at the appropriate physical location on the disk drive and read data into the internal buffer. When the read/write head is at the appropriate physical location and the internal buffer is full, the disk drive generates an interrupt thus indicating that it is prepared to transfer data to the CPU 102. Similarly, for a write operation, the disk drive generates an interrupt when the read/write head is at the appropriate physical location and the data in the internal buffer has been stored on the disk drive.

With respect to the disk striping aspect of the system 100, the operating system behaves as if there is a single disk drive, rather than the first disk drive 110 and the second disk drive 112. Thus, from the point of view of the operating system, there is a single large disk drive, rather than two smaller disk drives. The operating system uses a single FAT to determine the physical location of the data files in a conventional manner. The FAT contains data tracking the usage of the first disk drive 110 and the second disk drive 212 as if the two disk drives are merely one large disk drive. That is, the FAT contains data tracking the usage of a large disk drive, with some portions of this large disk drive being physically located on the first disk drive 110 and some portions being physically located on the second disk drive 112. Thus, the operating system is unaware that two physical disk drives exist. The BIOS 106 of the system 100 contains instructions to translate the commands from the operating system into data for the appropriate internal registers (not shown) of the first disk drive interface 110a and the second disk drive interface 112a. It is the instructions in the BIOS 106 itself that controls the positioning of the read/write head in the first disk drive 110 and the second disk drive 112.

If the system 100 is operating with two application programs accessing data files located on separate disk drives, the operating system is aware of two separate physical disk drives, each containing an independent FAT to determine the physical location of data files on each respective disk drive. The advantage of this implementation is that each software application program can independently access its own disk drive, thus allowing both the first disk drive 110 and the second disk drive 112 to be simultaneously active. It should be noted that the application programs themselves need not be on separate disk drives. It is only necessary that the application programs access separate disk drives so that both the first disk drive 110 and the second disk drive 112 can be simultaneously active.

Figure 2A:
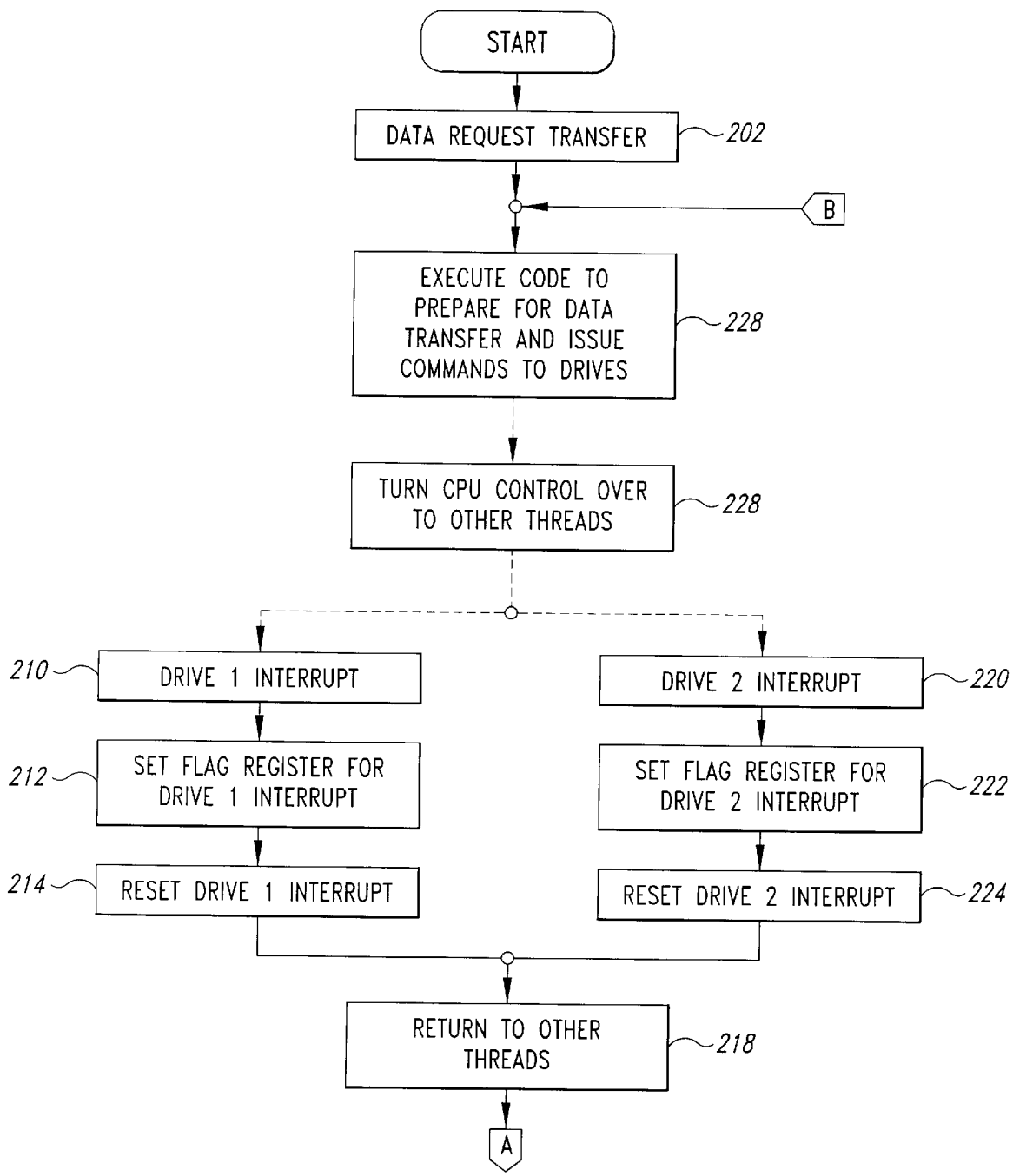
FIGS. 2A and 2B are flowcharts of the operation of the system of FIG. 1.
Figure 2B:
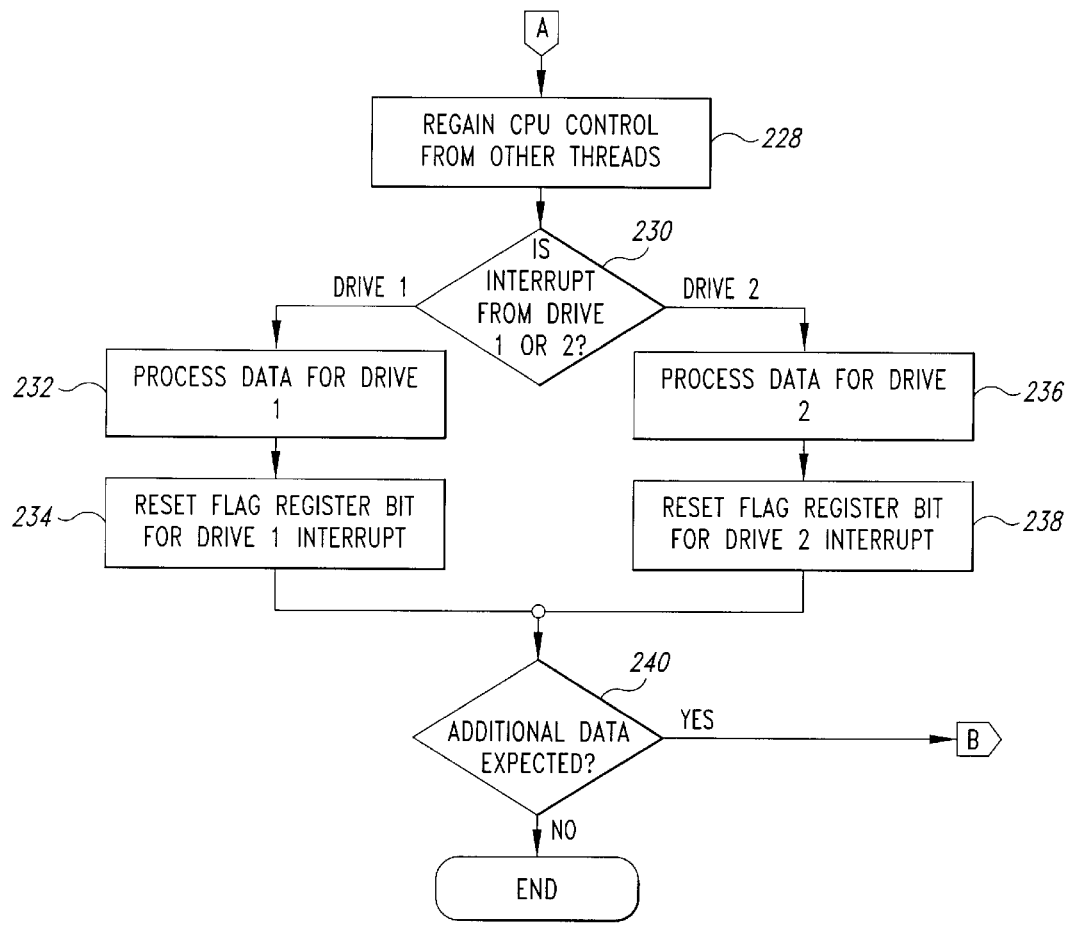

The operation of the system of FIG. 1 is illustrated in the flowcharts of FIGS. 2A and 2B. At a start 200, shown in FIG. 2A, the system 100 wishes to make a data transfer. It should be noted that the term data transfer is intended to encompass both reading data from the first and second disk drives 110 and 112 or writing data to the first and second disk drives. As previously discussed, the examples presented herein are directed to a read operation where data is transferred from the first disk drive 110 and the second disk drive 112 to the CPU 102. However, disk write operations are processed in a similar fashion. In step 202, the system makes a data transfer request, such as, for example, a data read operation. In step 204, the CPU 102 executes the code to prepare for the data transfer and issues a command to the first disk drive 110. As discussed above, the operating system uses the FAT to determine the physical location of an existing data file on the first disk drive 110 and the second disk drive 112. Similarly, the operating system uses the FAT to determine a location on the first disk drive 110 and the second disk drive 112 at which to store a data file when transferring data to the first and second disk drives. As noted above, the operating system uses a separate FAT for the first disk drive 10 and the second disk drive 112 if the system 100 is used with application programs accessing data files on the separate disk drives.

The BIOS 106 contains instructions, which the CPU 102 executes, to transfer data or commands to the internal registers of the first disk drive 110. For example, the disk transfer command to the first disk drive 110 will include data such as the physical location on the first disk drive from which the data file will be read. The BIOS 106 also contains instructions to issue commands to the second disk drive 112 in preparation for a data transfer with the second disk drive. As discussed above, in the disk striping embodiment of the system 100, a data file is apportioned into blocks that are alternately stored on the first disk drive 110 and the second disk drive 112. The system 100 advantageously allows the BIOS 106 to issue commands to both the first disk drive 110 and the second disk drive 112 to allow each of the first and second disk drives to simultaneously perform the time consuming task of positioning the read/write head at the proper location on the disk drive. As previously discussed, prior art systems do not permit such simultaneous instructions, since the prior art system has no way of determining which disk drives generated an interrupt.

While the first disk drive 110 and the second disk drive 112 are responding to the commands provided in step 204, the system 100 may turn control of the CPU 102 over to other operating system threads in step 208. As previously discussed, even in a multi-threaded operating system, such as Windows, the CPU 102 can only execute instructions for one thread at a time. However, while the first disk drive 110 and the second disk drive 112 are responding to the commands from step 204, the CPU 102 can execute other threads, giving the appearance of a multi-threaded system. Thus, in step 208, the CPU 102 is used to control other threads that are typically unrelated to the first and second disk drives 110 and 112. If the system 100 is operating with two independent software application programs, one thread being processed by the CPU 102 may be the first software application program accessing, for example, the first disk drive 110. When control of the CPU 102 is turned over to other processes in step 208, those "other processes" may include the second independent software application program, which may issue a data transfer command to the second disk drive 112 regardless of the fact that the first disk drive 110 is already active. Thus, even with two independent software application programs, the system 100 allows the first disk drive 110 and the second disk drive 112 to be simultaneously active.

At some point in time, either the first disk drive 110 or the second disk drive 112 will generate an interrupt. If the BIOS 106 sequentially issued commands to the first disk drive 110 and the second disk drive 112, the first disk drive would generally be the first to generate the interrupt. However, this may not always be the case. For example, the read/write head of the second disk drive 112 may be closer to the physical location specified by the operating system using the FAT. Therefore, it is conceivable that the second disk drive interface 112a will generate and interrupt first, even though it was issued commands following the commands issued to the first disk drive 110. Furthermore, as illustrated in Table 1, it is possible that interrupts may be generated by both the first disk drive 110 and the second disk drive 112 while the CPU 102 is processing a different thread. However, the system 100 is capable of processing interrupts from either the first disk drive 110, the second disk drive 112, or both disk drives regardless of the sequence in which the commands were issued to the disk drives and regardless of which disk drive generates the first interrupt.

As discussed above, the system 100 can determine which of the first and second disk drives 110 and 112 generated an interrupt by virtue of the data in the flag register 118 (see FIG. 1). If the first disk drive 110 is prepared for a data transfer, the first disk drive interface 110a generates an interrupt in step 210. In step 212, the interrupt detector 216 (see FIG. 1) detects the interrupt from the first disk drive 110 and sets the data in the flag register 118 to indicate an interrupt from the first disk drive. In step 214, the interrupt detector 116 resets the interrupt in the first disk drive interface 110a. It should be noted that the interrupt from the first disk drive 110 can occur at any point in time after it has received disk transfer commands. If the CPU 102 is executing a different thread that cannot be readily interrupted, it must allow the different thread to proceed to a point where it can be interrupted before returning control to the interrupt processor 122. Therefore, the code within the interrupt detector 116 and executed by the CPU 102 is extremely short and includes only steps 212 and 214. The short length of code executed by the interrupt detector 116 minimizes disruption of the CPU 102 while executing other threads. In step 218, the interrupt detector 116 returns control of the CPU to the other on-going thread.

When the second disk drive 112 is prepared for a data transfer, the second disk drive interface 112a issues in interrupt in step 220. The interrupt detector 116 detects the interrupt from the second disk drive 112 and, in step 222, sets the data bits in the flag register 118 to indicate that the second disk drive 112 has generated an interrupt. In step 224, the interrupt detector 116 resets the interrupt in the second disk drive interface 112a. As discussed above, the code within the interrupt detector 116, which is executed by the CPU 102, must be very short in length so as to minimize the disruption of a different thread that may be executed by the CPU when the interrupt from the second disk drive 112 occurs. Therefore, the interrupt detector 116 only performs steps 222 and 224 if the interrupt is from the second disk drive 112. Following the reset of the interrupt in the second disk drive interface 112a in step 224, the system 100, in step 218, returns control of the CPU 102 to the other on-going threads that may have been executing at the time the interrupt from the second disk drive 112 was generated.

When the data in the flag register 118 has been set to indicate that there is an interrupt from the fist disk drive 110, the second disk drive 112, or both disk drives, the system 100 permits the CPU 102 to process the on-going thread to a point where it can be interrupted so as to maximize CPU efficiency, and to prevent the corruption of other on-going threads that may be executing at the time. When the CPU 102 has completed execution of the other on-going thread to a point where it can be interrupted, in step 228, shown in FIG. 2B, the system 100 regains CPU control from those other threads. In decision 230, the system 100 determines whether the interrupt is from the first disk drive 110 or the second disk drive 112. As discussed above, this may be readily ascertained by an analysis of the contents of the flag register 118. As shown in Table 1 above, the flag register 118 contains a value of 01H if the interrupt was from the first disk drive 110, a value of 02H if the interrupt was from the second disk drive 112, or a value of 03H if there are interrupts from both the first and second disk drives which have not been processed by the interrupt processor 122. If the flag register 118 contains a value of 03H, decision 230 also includes the step of determining the sequence in which the first and second interrupts will be processed. This sequence determination sequence will be described in detail below.

If the interrupt was from the first disk drive 110, the system 100, in step 232, processes the data for the first disk drive. As discussed above, this processing will include either reading data from the first disk drive 110 or writing data to the first disk drive. Following the data processing in step 232, the system 100, in step 234, resets the data bit in the flag register that corresponds to the interrupt status for the first disk drive 110. If the interrupt was from the second disk drive 112, the system 100, in step 236, processes data for the second disk drive. Again, the data processing can include either reading data from the second disk drive 112 or writing data to the second disk drive. Following the processing of data for the second disk drive 112 in step 236, the system 100, in step 238, resets the data bit in the flag register that corresponds to the interrupt status for the second disk drive.

If the data in the flag register 118 is 03H, indicating that the first disk drive 110 and the second disk drive 112 both require interrupt processing, decision 230 must determine which interrupt to process first. There are several alternative techniques to determine which interrupt to process first. In one alternative, the system 100 processes the interrupt from the disk drive to which a command was first issued. For example, in the dual independent software application program embodiment of the system 100, the interrupt from the disk drive that first received data transfer commands from the CPU 102 is processed first. If the first software application program issued a data transfer command to the first disk drive 110 prior to the point in time where the second software application program issued a data transfer command to the second disk drive 112, the system 100 will process the interrupt from the first disk drive 110 before processing the interrupt from the second disk drive 112. Similarly, if the second software application program issued a data transfer command to the second disk drive 112 prior to the point in time where the first software application program issued a data transfer command to the first disk drive 110, the system 100 will process the interrupt for the second disk drive before processing the interrupt for the first disk drive.

In a second alternative technique for processing simultaneous interrupts, the two software application programs may be assigned priorities such that one software application program may operate essentially as a foreground task with a higher priority, while the other software application program operates as a background task with a lower priority. In this alternative, the system 100 will first process the interrupt from the disk drive associated with the higher priority task and then process the interrupt from the disk drive associated with the lower priority task.

It should be noted that the sequence of interrupt processing is irrelevant with the disk striping embodiment of the system 100. As previously discussed, disk striping involves the apportionment of data file into blocks that are alternatively stored on the first disk drive 110 and the second disk drive 112. If the data transfer command is a read command, the operating system allocates a portion of the RAM 104 (see FIG. 1) to receive the various blocks of data. The first block of data, which may be from the first disk drive 110, by way of example, will be stored in a corresponding first block of the RAM 104. The second block of data, which is stored on the second disk drive 112 in the present example, will be read into a second corresponding block of the RAM 104. As is well known to those of ordinary skill in the art, memory access times for the RAM 104 are identical for the first and second corresponding blocks, which will receive blocks of data from the first disk drive 110 and the second disk drive 112, respectively. The processing time to transfer the first block of data from the first disk drive 110 to the RAM 104 is virtually identical to the processing time to transfer the second block of data from the second disk drive 112 to the RAM. Therefore, if the data in the flag register is 03H, the interrupt processor 122 (see FIG. 1) can process either interrupt without regard to the sequence in which the interrupts were generated by the disk drives or the sequence in which data transfer commands were issued to the disk drives. However, in the presently preferred embodiment, the system 100 processes the interrupt from the disk drive which was the first to receive a data transfer command.

Following the reset of the data bits in the flag register 118 in step 234 or step 238, the system 100 moves to decision 240. In decision 240, the system determines whether additional data is expected. As is known to those of ordinary skill in the art, there is a maximum number of data blocks or sectors that can be transferred to or from a disk drive in a single interrupt. If a data file exceeds this maximum number, the data file must be transferred using more than one interrupt. In a presently preferred embodiment, it has been determined that disk striping works effectively with a maximum transfer size of 16 sectors, where one sector is defined as 512 bytes. However, the present invention is not limited by the maximum data transfer size. For example, disk drives with a larger internal buffer may be able to transfer more than 16 sectors of data. If the data to be transferred is larger than 16 sectors, the system 100 will read the first 16 sectors from one disk drive and will expect an additional interrupt to transfer additional sectors. With the disk striping implementation of the system 100 previously described, the first 16 sectors are transferred to or from one disk drive, such as the first disk drive 110, with the next 16 sectors being transferred to or from the second disk drive 112. If additional data transfers are required, the next 16 sectors would be to or from the first disk drive 10. This process is repeated with data transfers alternating between the first disk drive 110 and the second disk drive 112. The advantage of the system 100 is that both the first and second disk drives 110 and 112 can be responding to commands that overlap in time thus reducing disk access time and increasing the efficiency of the system 100.

As is known to those of ordinary skill in the art, the operating system provides an indication of the size of the data to be transferred to or from the disk drive. Therefore, the system 100 knows whether multiple interrupts will be required to complete a data transfer 16 sectors at a time. If additional data is not expected, the result of decision 240 is NO. In that event, the system 100 ends the disk transfer process at 242. If additional data transfers are expected, the result of decision 240 is YES. In that event, the system 100 returns to step 204, shown in FIG. 2A, where additional commands are issued to the first disk drive 110 and the second disk drive 112 in preparation for the additional data transfers. As discussed above, after the commands have been issued to the first disk drive 110 and the second disk drive 112 in step 204, the system 100 turns control of the CPU 102 over to other threads in step 208 until another interrupt is generated from the first or second disk drives 110 and 112.

Tests have indicated that the inventive disk striping technique provides approximately a 10% improvement in efficiency of data transfers to and from the first and second disk drives 110 and 112. The present invention advantageously allows both disk drives to be actively responding to commands and generate interrupts in a truly multi-threaded interrupt processing operation. The system 100 can determine which of the disk drives has generated the interrupt by virtue of the data encoded in the flag register 118. However, while a disk transfer is occurring with one disk drive, the remaining disk drive is responding to commands and preparing for data transfers. Thus, when a data transfer with one disk drive is complete, the remaining disk drive is prepared for its data transfer.

It should be noted that the system 100 achieves this improvement in efficiency by allowing the first disk drive 110 and the second disk drive 112 to be active simultaneously. While the flow chart of FIGS. 2A and 2B illustrate the inventive process, it should be noted that alternative procedures may be employed by the system 100. For example, step 204, in FIG. 2A, illustrates the operation of the system 100 to issue commands to both the first disk drive 110 and the second disk drive 112. However, the system 100 can issue commands to only one disk drive as well. For example, the system 100 may initially issue commands to both the first disk drive 110 and the second disk drive 112, as illustrated in step 204. Assuming that the first disk drive 110 generates an interrupt before the second disk drive 112, the system 100 will process data for the first disk drive 110 in step 232, shown in FIG. 2B. However, the system 100 may issue additional commands to the first disk drive 110 following the completion of step 232. In this manner, the first disk drive 110 will receive commands and prepare for an additional data transfer. Thus, while the system 100 responds to the interrupt from the second disk drive 112, and processes data for the second disk drive in step 236, the first disk drive 110 is simultaneously responding to additional commands so that it will be prepared to transfer data upon the completion of the data transfer with the second disk drive in step 238. In this manner, the system 100 can issue commands to the first disk drive 110, the second disk drive 112, and additional disk drives thus further improving disk transfer efficiency.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for multi-threaded operation of multiple disk drives in a computer, the system comprising:

a first disk drive having an interrupt generating circuit to generate a first interrupt signal and receiving a first disk transfer command from the computer, said first disk drive processing said first disk transfer command as a first thread of the multi-threaded operation and generating said first interrupt signal upon completion of said first disk data transfer command;

a second disk drive having an interrupt generating circuit to generate a second interrupt signal and receiving a second disk transfer command from the computer while said first disk drive is processing said first disk transfer command wherein said first and second disk drives are simultaneously active as multi-threaded operations, said second disk drive processing said second disk transfer command as a second thread of the multi-threaded operation and generating said second interrupt signal upon completion of said second disk data transfer command;

an interrupt detector software module to detect said first and second interrupt signals and to generate an interrupt indicator signal in response thereto; and an interrupt processor software module to analyze said interrupt indicator signal and determine therefrom which of said first and second disk drives generated said interrupt signal, said input processor software module processing interrupt signals to control said data transfer between the computer and the one of said first and second disk drives that generated an interrupt signal.

2. The system of claim 1 wherein said first disk drive receives a third disk data transfer command from the computer while said second disk drive is processing said second disk transfer command wherein said first and second disk drives are simultaneously active and processing said third and second disk data transfer commands, respectively.

3. The system of claim 1 wherein said disk data transfer commands include read commands to perform a read operation to transfer data stored on said first and second disk drives to the computer.

4. The system of claim 1 wherein the computer is executing first and second application programs, said first application program generating said first disk data transfer command to control data transfer between said first disk drive and said first application program as the first thread of the multi-threaded operation, said second application program generating said second disk data transfer command to control data transfer between said second disk drive and said second application program as the second thread of the multi-threaded operation while said first disk drive is processing said first data transfer command to thereby provide multi-threaded disk drive operation.

5. The system of claim 1 wherein said first and second disk drives alternately transfer a predetermined portion of data between said first and second disk drives and the computer, said first disk drive generating said first interrupt signal upon completion of first disk transfer command to transfer a first portion of data and said second disk drive generating said second interrupt signal upon completion of said second disk transfer command to transfer a second portion of data.

6. The system of claim 5 wherein said first and second disk data transfer commands from the computer are sequentially received by said first disk drive and said second disk drive to transfer said first and second portions of data, respectively.

7. The system of claim 6 wherein said interrupt processor software module transfers said predetermined portion of data to a first of said first and second disk drives to generate said first and second respective interrupt signals.

8. The system of claim 7 wherein said first disk drive generates said first interrupt signal prior to said second disk drive generating said second interrupt signal, said interrupt processor software module transferring said first portion of data between the computer and said first disk drive prior to said interrupt processor software module transferring said second portion of data between the computer and said second disk drive.

9. The system of claim 1 wherein said interrupt detector detects said first and second interrupt signals and generates said interrupt indicator signal in response to both said first and second interrupt signals prior to said analysis by said interrupt processor software module, said interrupt processor software module processing said first and second interrupt signals in a predetermined sequence to control data transfer between the computer and a one of said first and second disk drives determined by said predetermined sequence.

10. The system of claim 9 wherein said predetermined sequence is determined by a command sequence in which said first and second disk transfer commands are received by said first and second disk drives.

11. The system of claim 10 wherein said first disk drive receives said first disk transfer command prior to said second disk drive receiving said second disk transfer command and said interrupt processor software module processes said first interrupt signal prior to processing said second interrupt signal.

12. A system for multi-threaded operation of multiple disk drives in a multi-tasking computer, the system comprising:

first and second disk drives, each having an interrupt generating circuit to generate first and second interrupt signals, respectively, and receiving disk data transfer commands from the computer wherein said first and second disk drives are simultaneously active as independent threads of the multi-threaded operation, said first disk drive generating said first interrupt signal upon completion of said received disk data transfer command, said second disk drive generating said second interrupt signal upon completion of said received disk data transfer command;

a flag register containing a plurality of data bits encoded in a manner indicative of an operational status of said first and second disk drives;

an interrupt detector software module to detect said first and second interrupt signals, said interrupt detector software module detecting said first interrupt signal and setting said flag register data bits in a first predetermined pattern in response thereto thereby indicating completion of a first of said independent threads of the multi-threaded operation, said interrupt detector software module detecting said second interrupt signal and setting said flag register data bits in a second predetermined pattern in response thereto, thereby indicating completion of a second of said independent threads of the multi-threaded operation; and an interrupt processor software module to analyze said flag register data bits and determine therefrom which of said first and second disk drives generated said interrupt signal, said interrupt processor software module processing interrupt signals to control said data transfer with said disk drive that generated said interrupt signal.

13. The system of claim 12 wherein said interrupt detector software module resets said first interrupt signal when setting said flag register data bits in said first predetermined manner and resets said second interrupt signal when setting said flag register data bits in said second predetermined manner.

14. The system of claim 12 wherein said disk data transfer commands includes read commands to perform a read operation to transfer data stored on said first and second disk drives to the computer.

15. The system of claim 12 wherein the computer is executing first and second application programs, said first application program generating a first disk data transfer command as part of said first thread to control data transfer between said first disk drive and said first application program, said second application program generating a second disk data transfer command as part of said second thread to control data transfer between said second disk drive and said second application program while said first disk drive is processing said first data transfer command.

16. The system of claim 12 wherein said interrupt detector software module detects said first and second interrupt signals and generates said interrupt indicator signal in a third predetermined pattern in response to both said first and second interrupt signals prior to said analysis by said interrupt processor software module, said interrupt processor software module processing said first and second interrupt signals in a predetermined sequence to control data transfer between the computer and a one of said first and second disk drives determined by said predetermined sequence.

17. The system of claim 16 wherein said first disk drive receives a first disk transfer command prior to said second disk drive receiving a second disk transfer command and said interrupt processor software module processes said first interrupt signal prior to processing said second interrupt signal.

18. The system of claim 12 wherein said first and second disk drives alternately transfer a predetermined portion of data between said first and second disk drives and the computer, said first disk drive generating said first interrupt signal when ready to transfer a first portion of data and said second disk drive generating said second interrupt signal when ready to transfer a second portion of data.

19. The system of claim 18 wherein said disk data transfer commands from the computer are sequentially received by said first disk drive and second disk drive to transfer said first and second portions of data, respectively.

20. The system of claim 19 wherein said interrupt processor software module transfers said predetermined portion of data to a first of said first and second disk drives to generate said first and second interrupt signals, respectively.

21. The system of claim 20 wherein said first disk drive generates said first interrupt signal prior to said second disk drive generating said second interrupt signal, said interrupt processor software module transferring said first predetermined portion of data between the computer and said first disk drive prior to said interrupt processor software module transferring said second predetermined portion of data between the computer and said second disk drive.

22. The system of claim 18 wherein said predetermined portion of data is sixteen sectors.

* * * * *

UNITED STATES PATENT AND TRADEMARK OFFICE
CERTIFICATE OF CORRECTION

PATENT NO. : 5,905,910
DATED : May 19, 1999
INVENTOR(S) : Anderson

It is certified that error appears in the above-identified patent and that said Letters Patent is hereby corrected as shown below:

| Column | Reads | Should Read |
| --- | --- | --- |
| Column 2, lines 48, 49 | "one embodiment the" | -- one embodiment of the -- |
| Column 3, line 35 | "fells" | -- fills -- |
| Column 6, line 45 | "register 18" | -- register 118 -- |
| Column 7, line 20 | "different read" | -- different thread -- |
| Column 8, line 2 | "212" | -- 112 -- |
| Column 8, line 50 | "drive 10" | -- drive 110 -- |
| Column 9, line 57 | "detector 216" | -- detector 116 -- |

Signed and Sealed this

Twenty-ninth Day of May, 2001

Attest:

NICHOLAS P. GODICI

Attesting Officer

Acting Director of the United States Patent and Trademark Office